Sept. 28, 1937.　　　　　N. C. SMART　　　　　2,094,047
SYSTEM OF CONTROL FOR ELECTRICALLY OPERATED LIFTS
Filed June 27, 1936　　　11 Sheets-Sheet 1

INVENTOR
Norman C. Smart
BY
ATTORNEY

Figure 1:
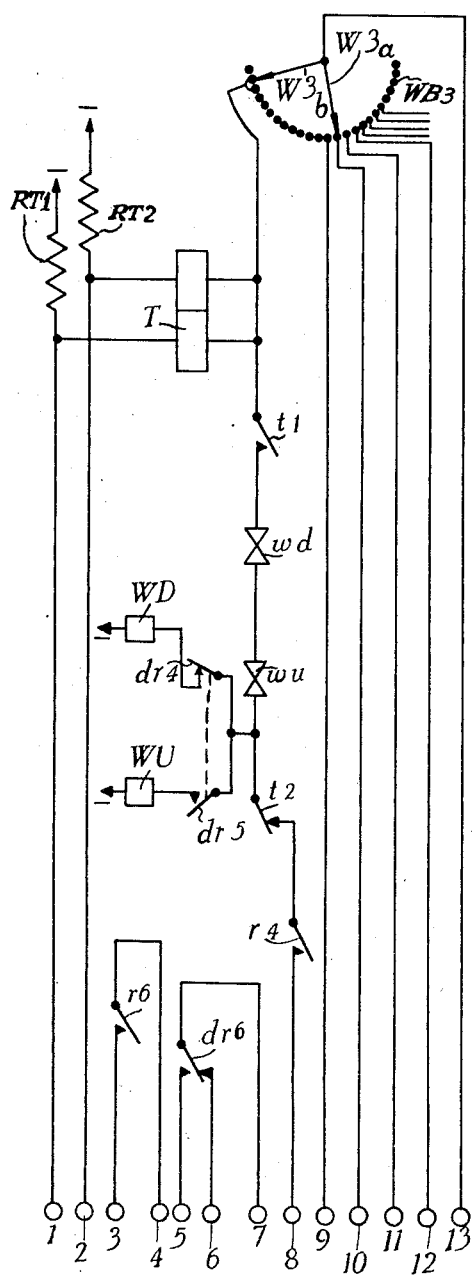

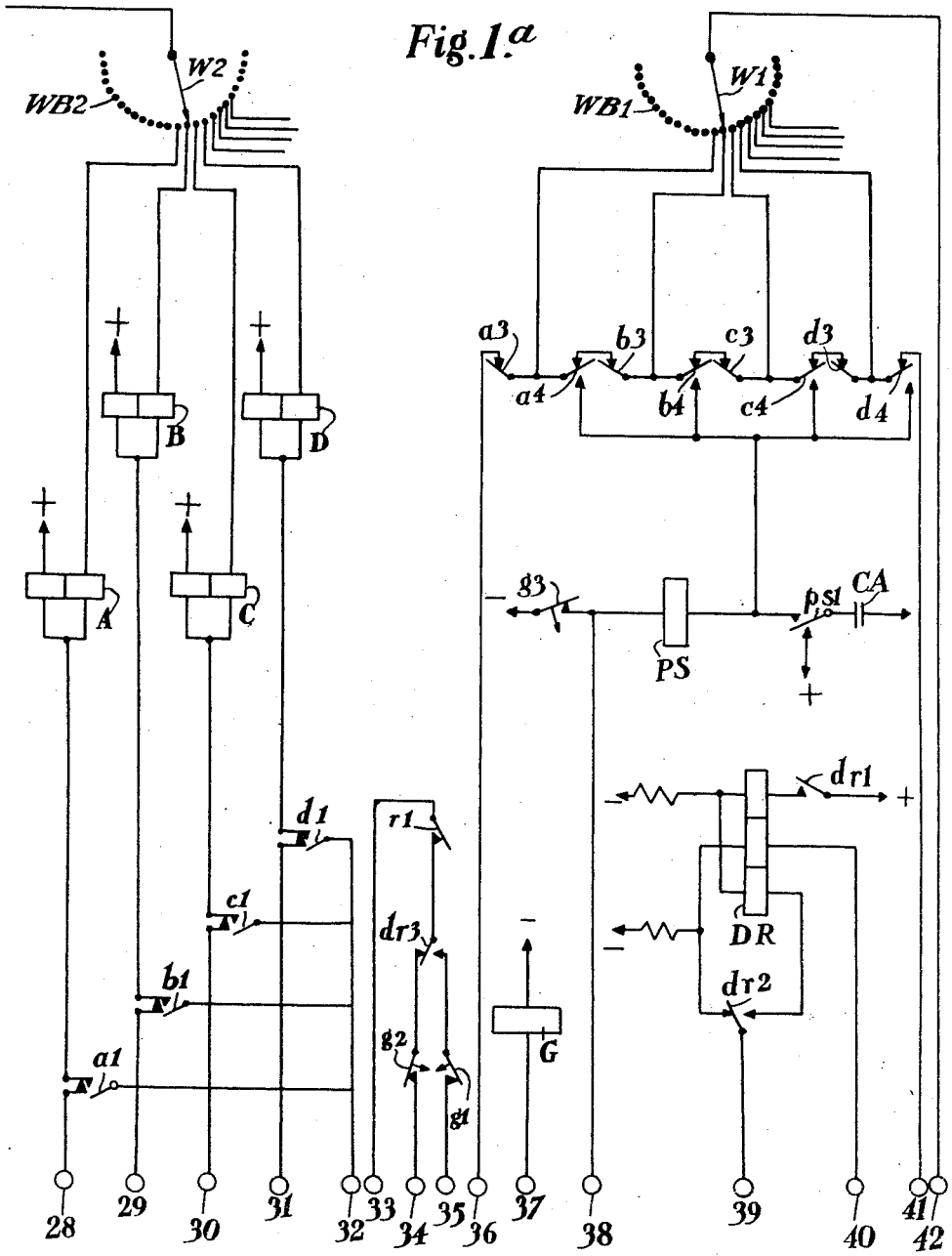
Fig.1.ª

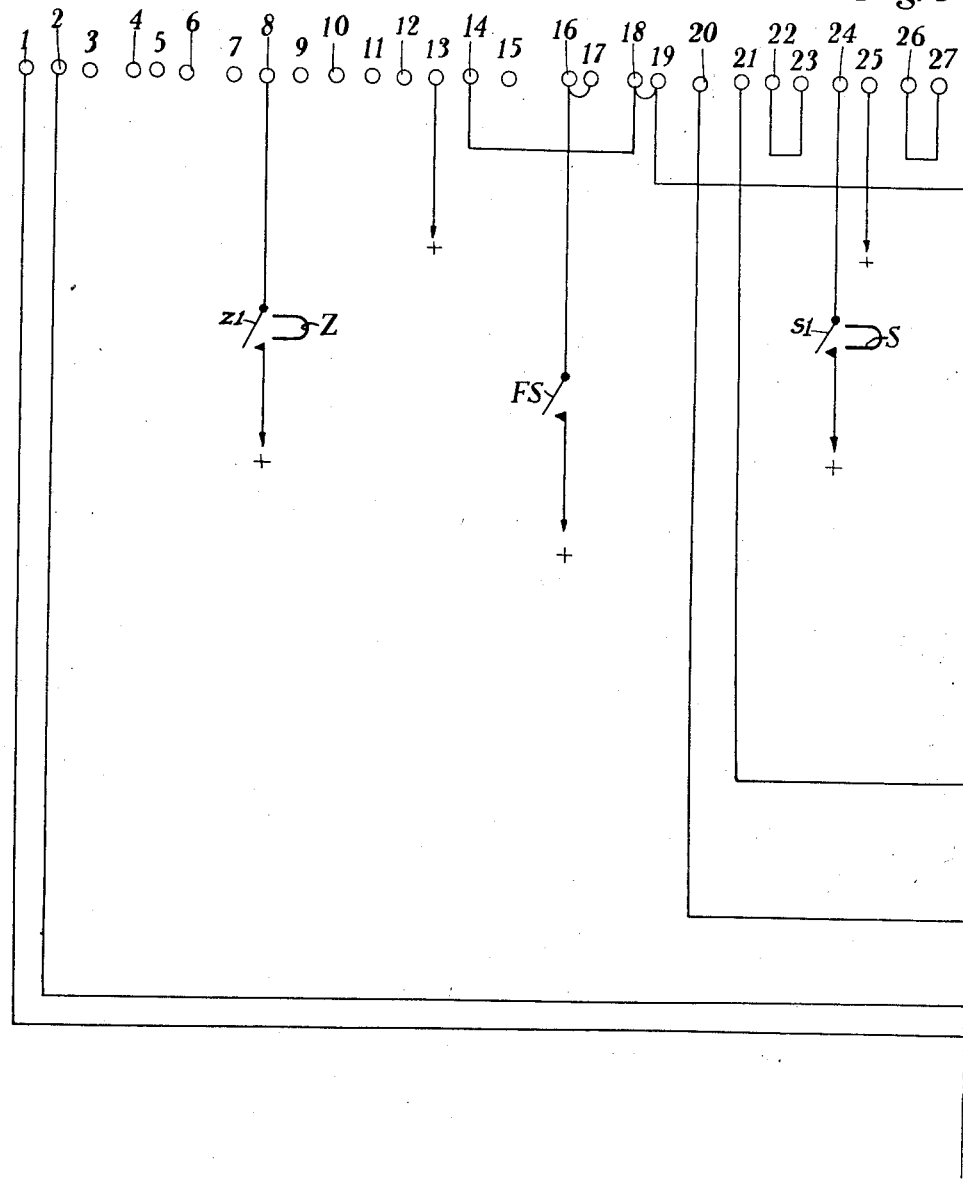

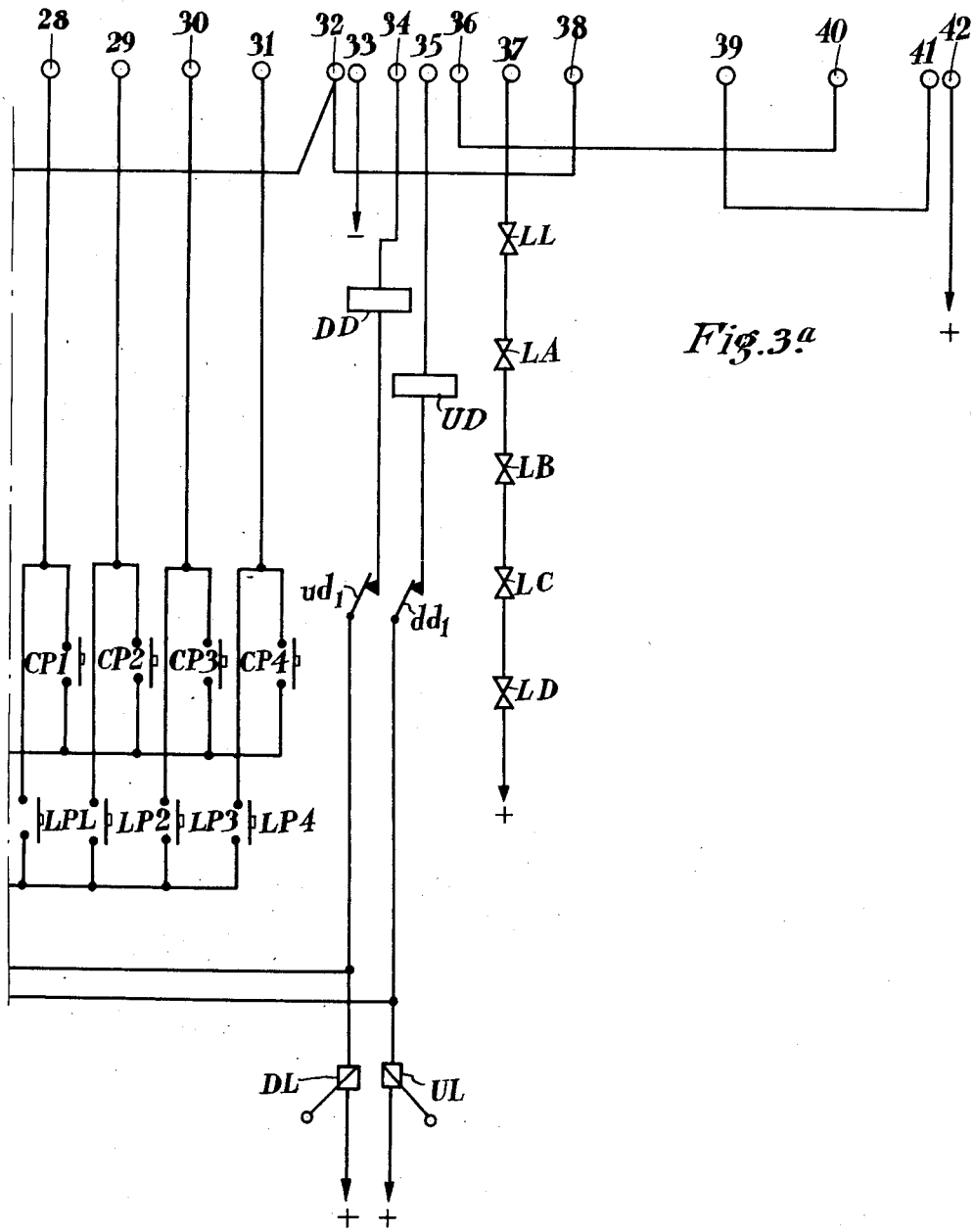
Fig. 3.ª

Sept. 28, 1937.   N. C. SMART   2,094,047
SYSTEM OF CONTROL FOR ELECTRICALLY OPERATED LIFTS
Filed June 27, 1936   11 Sheets-Sheet 7

INVENTOR
Norman C. Smart
BY
ATTORNEY

Sept. 28, 1937.   N. C. SMART   2,094,047
SYSTEM OF CONTROL FOR ELECTRICALLY OPERATED LIFTS
Filed June 27, 1936   11 Sheets-Sheet 8
Fig. 5.a
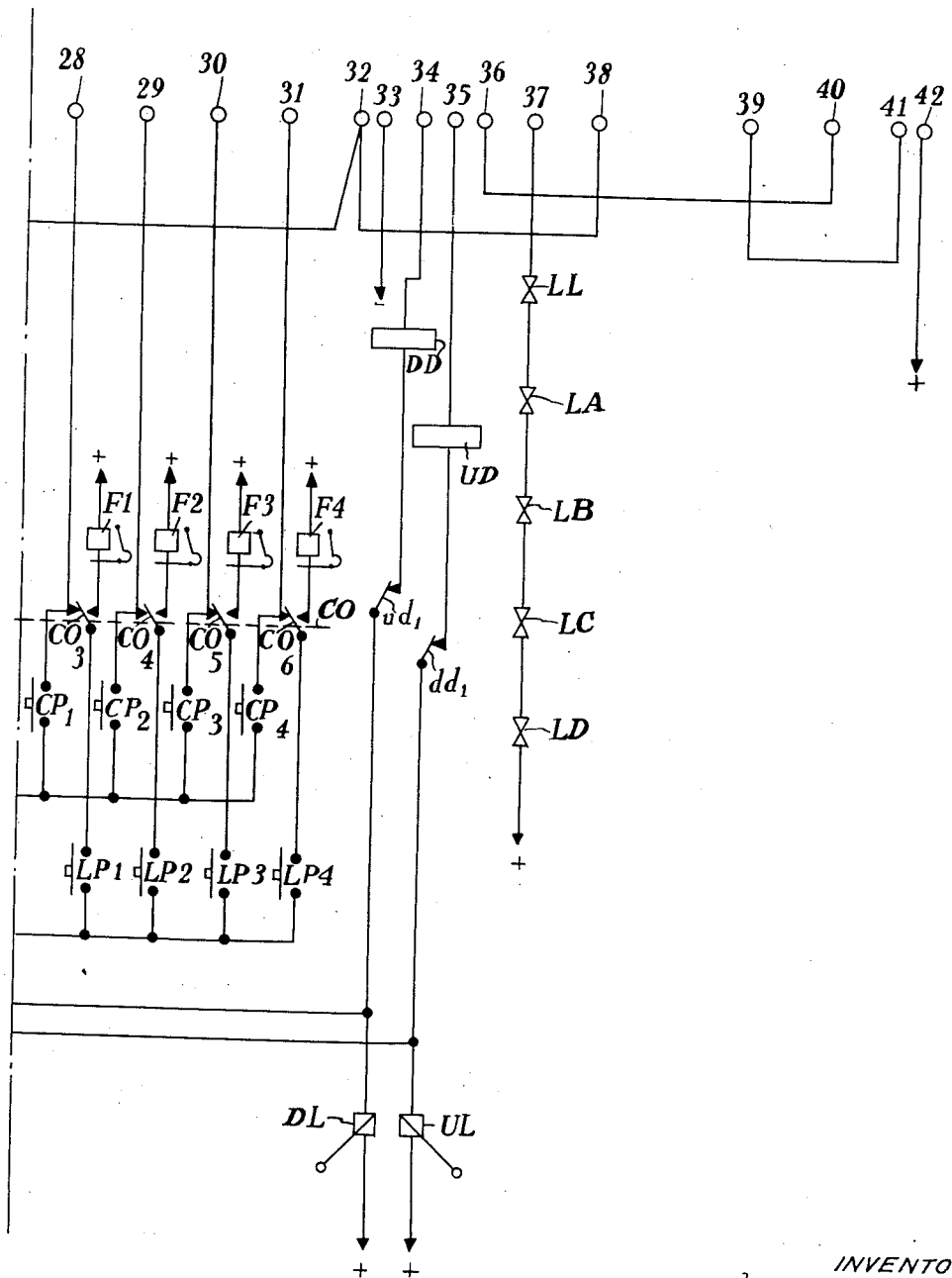

Sept. 28, 1937.　　　　N. C. SMART　　　　2,094,047
SYSTEM OF CONTROL FOR ELECTRICALLY OPERATED LIFTS
Filed June 27, 1936　　11 Sheets-Sheet 9
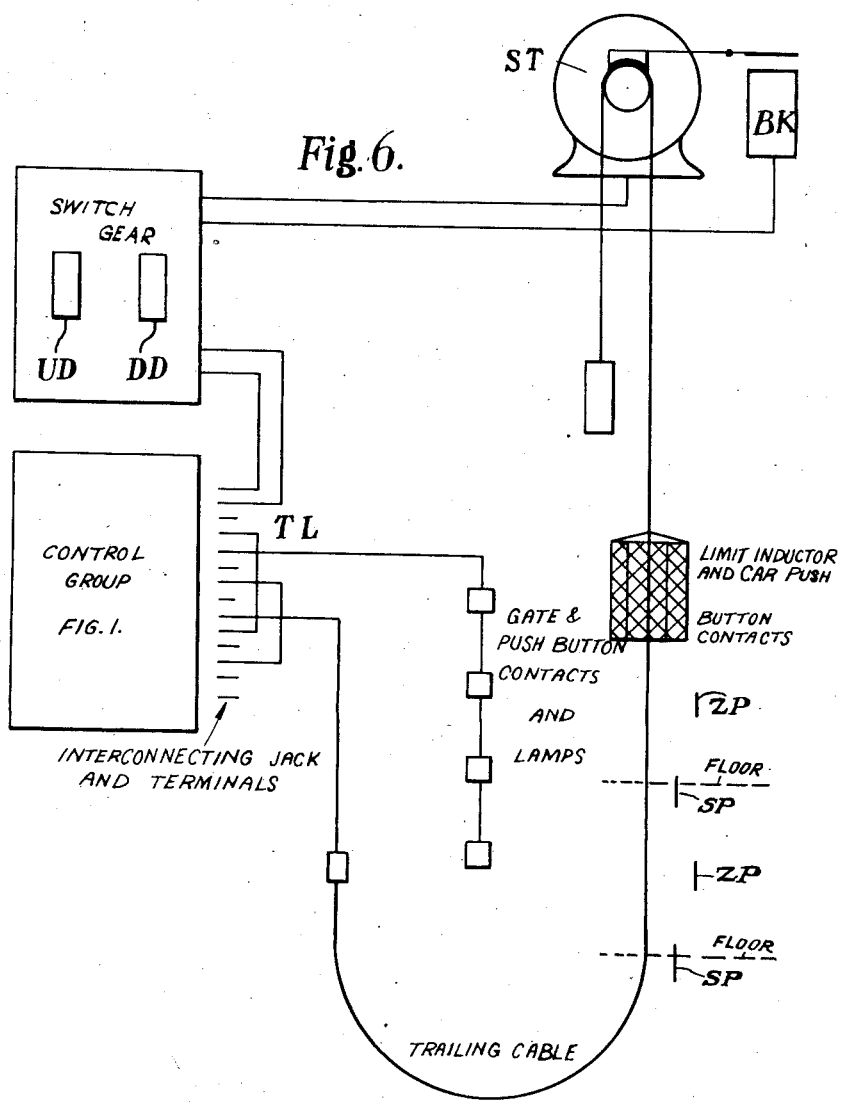

Sept. 28, 1937.    N. C. SMART    2,094,047
SYSTEM OF CONTROL FOR ELECTRICALLY OPERATED LIFTS
Filed June 27, 1936    11 Sheets-Sheet 10

INVENTOR
Norman C. Smart
BY
M. H. Lockwood
ATTORNEY

Sept. 28, 1937.  N. C. SMART  2,094,047
SYSTEM OF CONTROL FOR ELECTRICALLY OPERATED LIFTS
Filed June 27, 1936   11 Sheets-Sheet 11

Patented Sept. 28, 1937

2,094,047

UNITED STATES PATENT OFFICE 2,094,047

SYSTEM OF CONTROL FOR ELECTRICALLY OPERATED LIFTS

Norman Carol Smart, Binley, Coventry, England, assignor to The General Electric Company Limited, London, England Application June 27, 1936, Serial No. 87,606
In Great Britain July 12, 1935

10 Claims. (Cl. 187—29)

This invention relates to systems of control for electrically operated lifts and has for its object the provision of such a control system which is economical in apparatus and of great flexibility. If all the controlling devices associated with an automatic or semi-automatic lift are grouped in one apparatus unit, it is found that this unit must include means for call storage, means for following or indicating the lift's position at any instant, means for indicating the direction in which the lift is required to travel, and if the lift is of the high speed type, means for controlling the point in any traverse at which deceleration must commence. A unit including apparatus for performing all these functions may therefore be used without substantial alteration by almost any such automatic or semi-automatic lift, and the present invention consists in so arranging and mounting the said apparatus on one or more mounting plates provided with terminals or jacks, that the said plates are of standard form, and interchangeable with similar plates on any variety of control system, the variations necessary to effect different kinds of control being made by interconnections between terminals on the plate mountings.

Reference should now be made to the accompanying diagrammatic "divorced contact" drawings, the figures of which illustrate the following:—

Figures 1 and 1a, control apparatus circuit.

Figure 2:
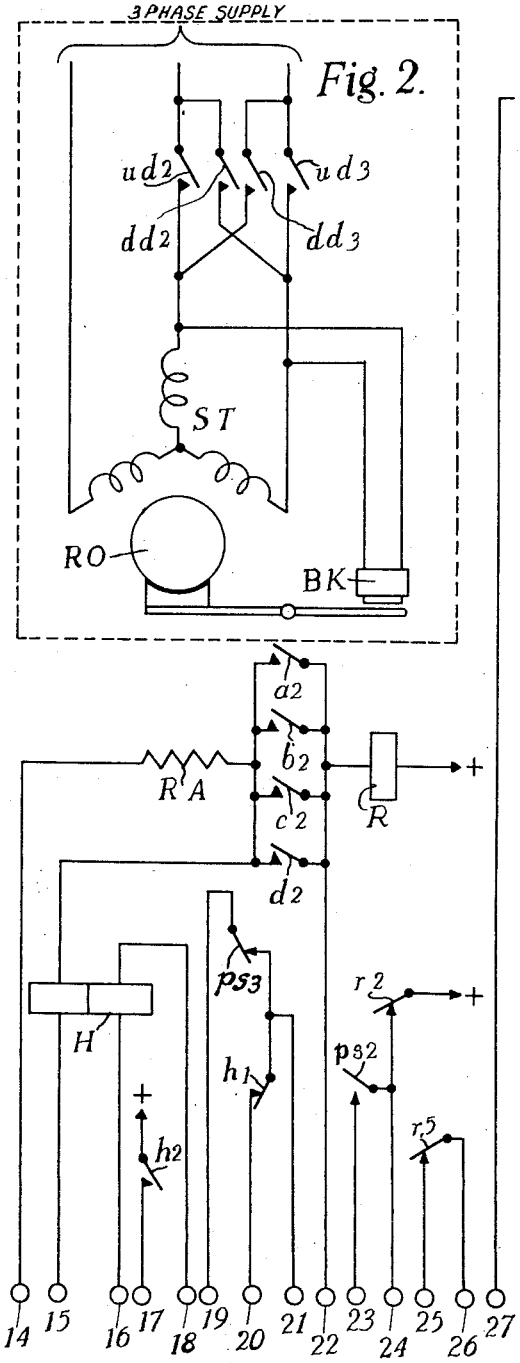

Figure 2, driving motor and switchgear.

Figures 3 and 3a, terminal connections for use with a fully automatic push button lift.

Figure 4:
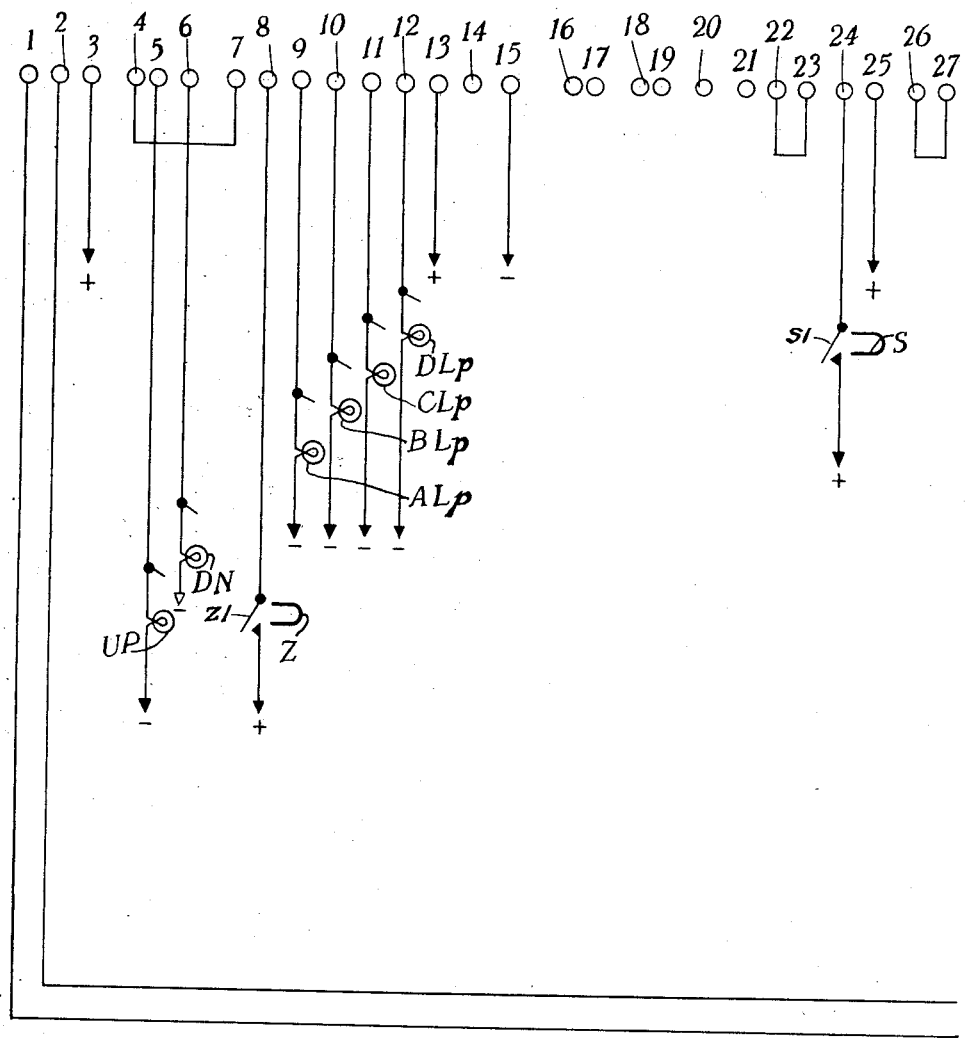
Figure 4A:
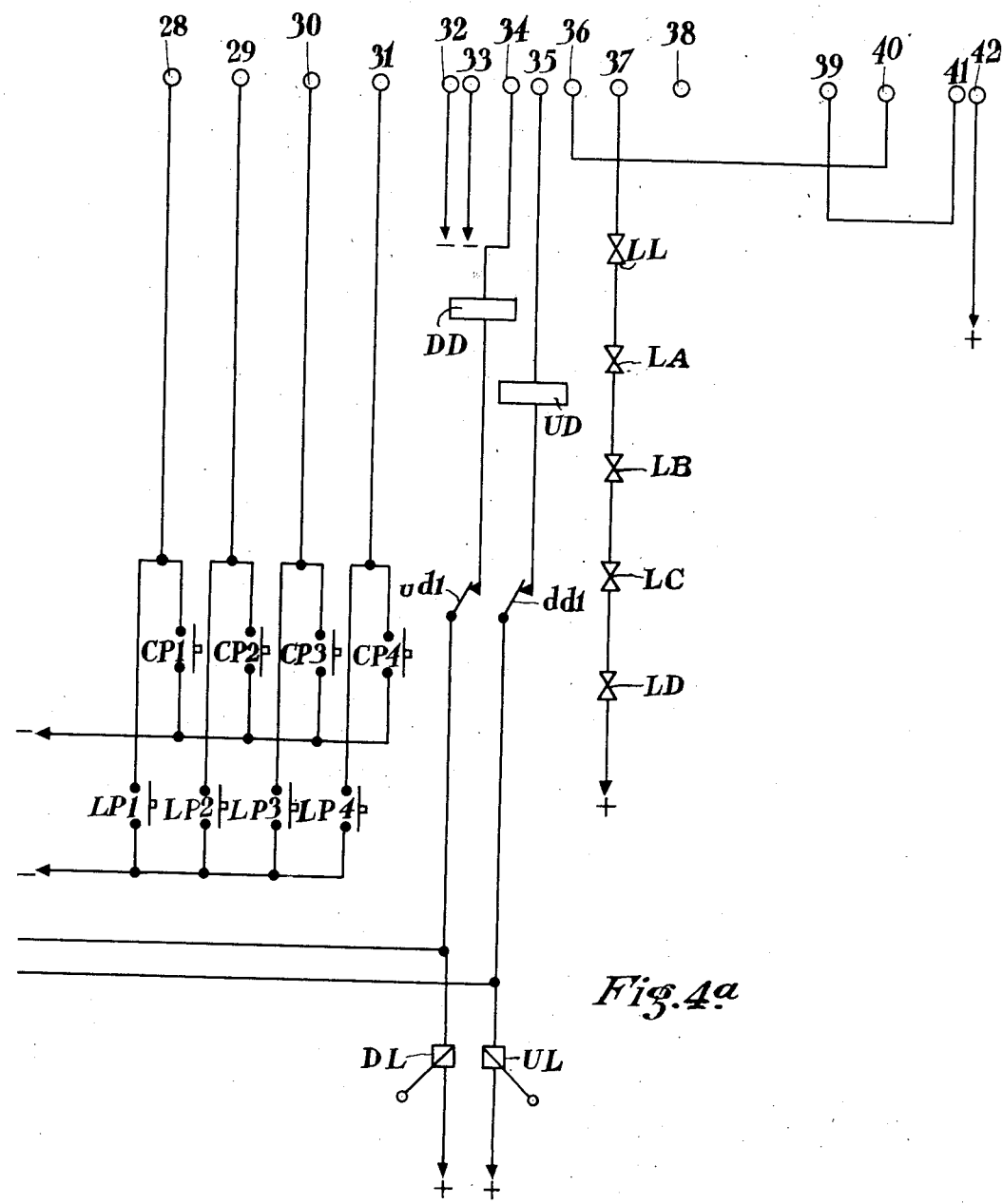

Figures 4 and 4a, terminal connections for use with a single-button type collector lift.

Figure 5:
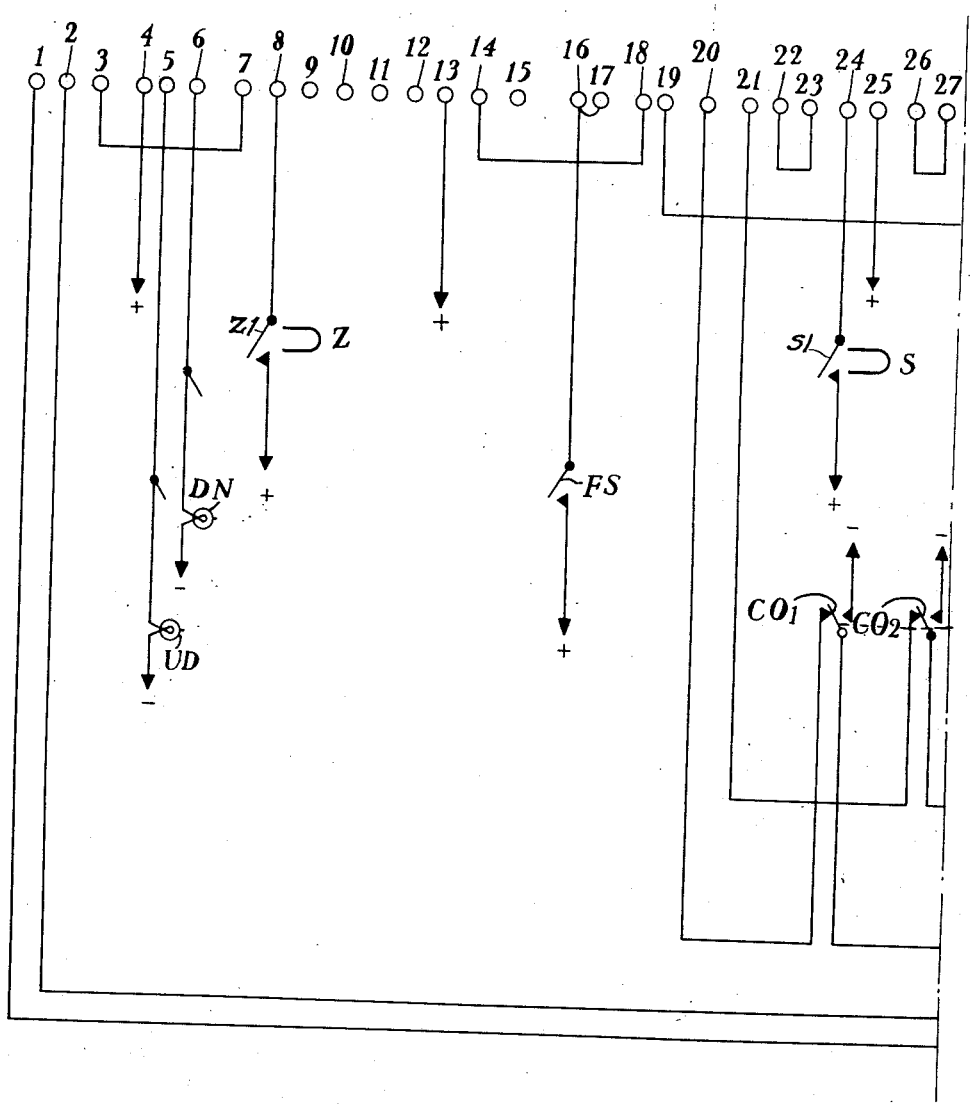

Figures 5 and 5a, terminal connections for use with a fully automatic, convertible to manually operated, push button lift.

Figure 6, diagram of apparatus lay-out.

Figure 7:
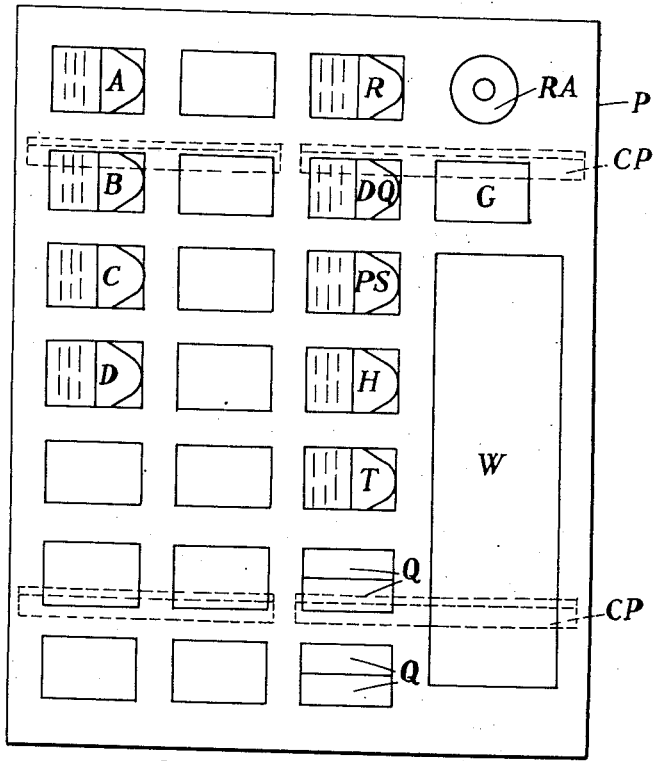

Figure 7, diagram of control plate.

Figure 8:
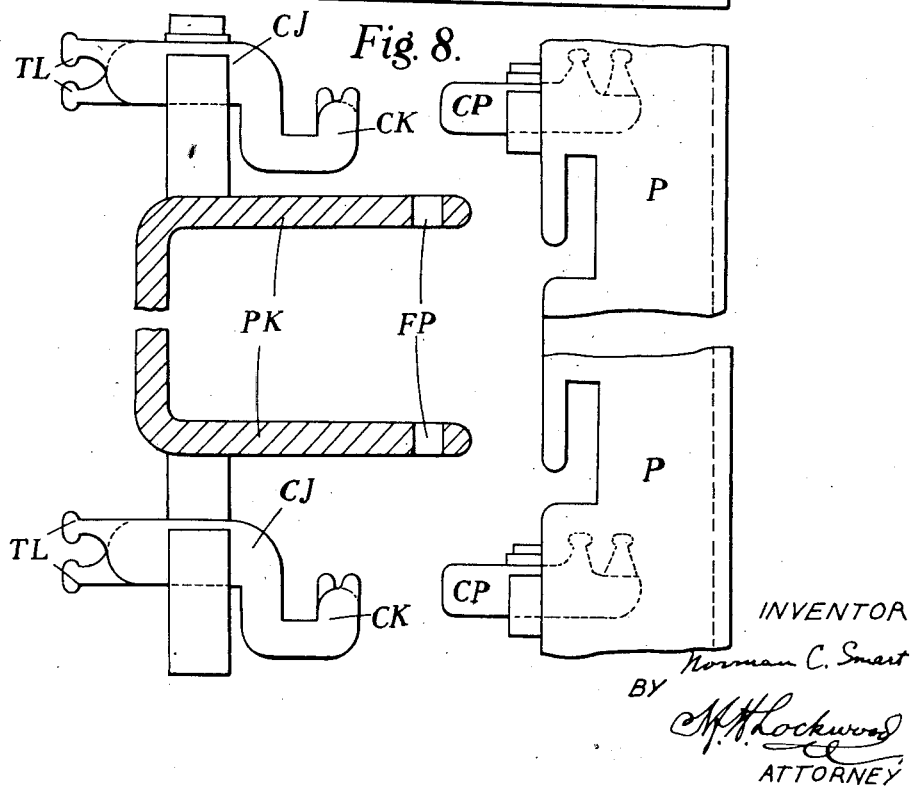

Figure 8, interconnecting jack and terminal strip.

Figure 9:
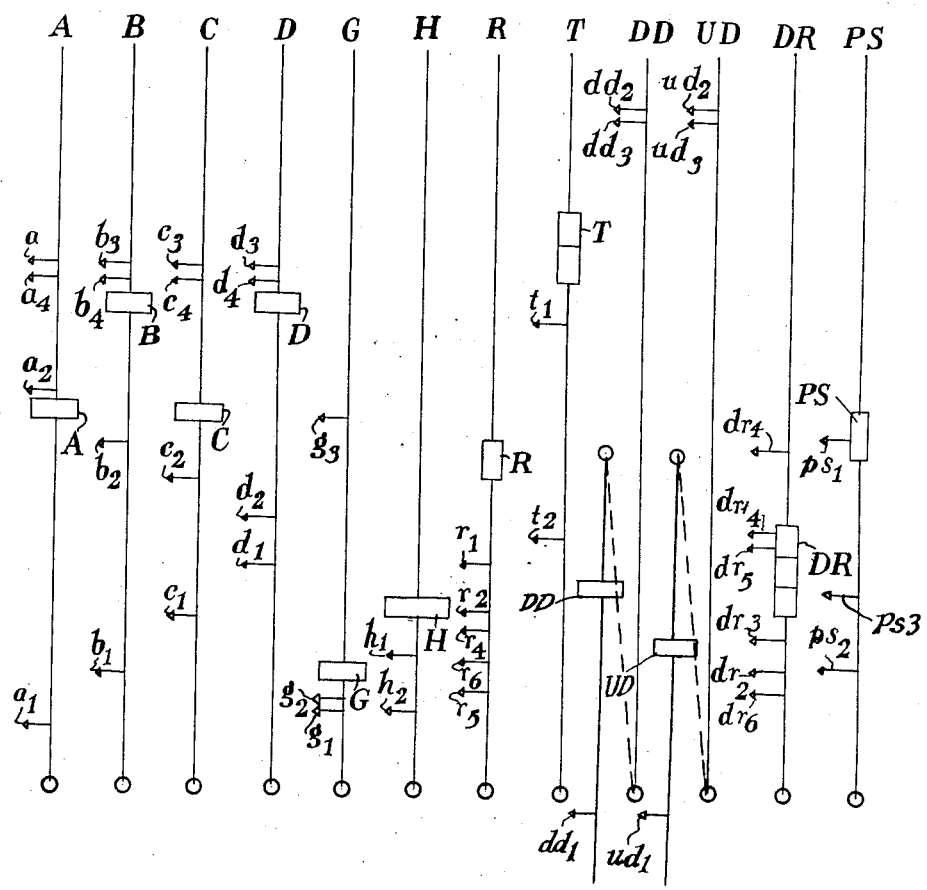

Figure 9, a code sheet for the more ready understanding of Figures 1, 1a, and 2, in association with any one of Figures 3, 3a, 4, 4a and 5, 5a.

The Figures 3 and 3a, 4 and 4a and 5 and 5a are interchangeable, and should be placed one at a time below Figures 1 and 1a, the apparatus in which is all mounted on a single plate.

Obviously certain facilities are required in connection with each system which are not required, or required only in modified form, on the other systems. Means are provided for giving all these facilities in the control group, certain sections thereof remaining unused, depending on which system is required. It has been found that this enables the manufacture of a single type of control unit for many types of lift, and the resultant cheapening due to repetition considerably outweighs the cost of providing, on each system, a relatively small amount of unused apparatus.

Assuming now that Figures 3 and 3a have been positioned beneath Figures 1 and 1a, with correspondingly numbered terminals opposite one another, a control system for a fully automatic push-button type lift is obtained. In this system, a passenger at a landing depresses a push-button whereon the lift, if free, travels to and stops at the landing. The passenger then enters the lift and thereafter has complete control of it, all other calls being disregarded until the passenger has arrived at his destination, left the car and shut the gate.

The lift driving mechanism is shown in Figure 2. It consists of a motor having a stator ST and a rotor RO, the stator being connected to a 3-phase supply, though of course any suitable source of power may be used. The motor drives the lift car (not shown) in the shaft by means of the usual cable and counterweight, and the car is stopped at appropriate points by means of the brake BK.

The motion of the lift in the shaft is followed by means of a stepping wiper switch (Figures 1 and 1a) of the type described in British Patent Specification No. 432,606, having two stepping magnets WU and WD, the first (WU) being energized when the lift moves upwards and the latter (WD) when the lift moves downwards. These stepping magnets drive the wipers W1, W2, W3a and W3b over their associated contact banks WB1, WB2 and WB3 in a direction which always corresponds with that of the lift's direction of travel.

The contact of bank WB1 is connected with a series of call storage relay contacts $a_3$, $a_4$, $b_3$, $c_3$, $c_4$, $d_3$, $d_4$; (four floors) which, when a call is stored, are so operated as to indicate to the lift mechanism in which direction the lift is required to drive. The contacts of bank WB2 are connected to call storage relays A—D. The latter, in cooperation with the lift car push buttons CP1–CP4 and landing (floor) push buttons LP1–LP4 (Figs. 3 and 3a) act as call storage devices. The wipers W3a and W3b both cooperating with contact bank WB3, are used for lighting indicating lamps and ensuring synchronism between the positions of the lift and the stepping switch. The remainder of the circuit is concerned with starting and stopping arrangements, and provision is shown for dealing with four landings or floors, though this number may of course be easily extended.

It is proposed to illustrate the operation of the circuit by means of a typical traverse. All apparatus is shown in a normal position, i. e. that occupied when the lift is standing, for instance, at the second floor, and no calls are awaiting attention.

Assuming that a call is made for the lift at the fourth floor, as for example by depression of a push button LP4, (Figs. 3 and 3a) then a circuit is completed from the positive through call storage relay D, through normally closed portion of contacts $d_1$, jack terminals 31, push button LP4, jack terminals 20, contacts $h_1$ and $ps_3$; jack terminals 19 and 38, through contact $g_3$ (normally closed) to negative. Call storage relay D operates.

It should here be stated that the gate relay G is a relay which is only operated when all the gates are closed. Each gate has a contact such as LA–LD, (Fig. 3a) and a further contact LL is inserted in series with the gate contacts, LL being the emergency push button in the lift car. The opening of any gate, or depression of the emergency push button releases the gate relay G. Contacts $g_1$, $g_2$, $g_3$ of gate relay G are shown in their normal (operated) positions, this operated condition being indicated by an arrow on each contact. Upon operation of call storage relay D the contact $d_1$ opens the closed portion of the contact and locks the relay D operated to negative on $g_3$ via terminals 32, 38.

$d_2$ operates start relay R, from positive beyond the relay via jack terminals 14, 38 to negative on contact $g_3$.

$d_3$ breaks a path from positive from terminals 42 through wiper W1 on second contact (lift at 2nd floor) through call storage relay contacts $b_4$, $c_3$, $c_4$, $d_3$, $d_4$, terminals 41, 39 and contact $dr_2$ (in left position) which removes a short circuit from one coil of direction relay DR. This relay DR now operates from the same positive from terminals 42 and wiper W1 through call storage contacts $b_3$, $a_4$, $a_3$, terminals 36, 40, to negative through one coil (central) of direction relay DR.

$r_1$ closing operates the up drive contactor UD from positive below upper limit switch UL through contact $dd_1$, jack terminals 35, contacts $g_1$, $dr_3$ (at right) contact $r_1$, jack terminals 33 to negative.

$ud_1$ opening prevents incorrect operation of the down drive contactor DD.

$ud_2$ and $ud_3$ (Figure 2) apply current from the 3-phase supply to the stator of the driving motor and also to the brake magnet BK.

The lift now moves away from the floor at which it was standing in a direction towards the call to be answered, that is from the second towards the fourth floor in the example, the brake being held off so long as the motor is energized. Although not shown, the motor may be provided with automatic starting arrangements whereby its speed is increased gradually or in a series of steps, such a device being well known and operating automatically. When the lift passes a point approximately half-way between the second and third floors, an inductor plate ZP (Fig. 6) in the shaft is passed thereby operating the inductor relay Z momentarily and closing its contact $z_1$. This closure of contact $z_1$ applies positive via jack terminals 8, contacts $r_4$, $t_2$ and $dr_5$ to the switch stepping magnet WU which steps the wipers W1, W2, W3, and W4 one contact space in the direction corresponding to the lift's travel, that is up, in the example given. The lift continues to travel until another inductor plate ZP is passed midway between the third and fourth floors, when another step is given by the inductor relay Z to the stepping magnet WU, this bringing the wipers W1, W2, W3a and W3b to the fourth contacts on the respective banks, only four being shown as wired in the drawings. A circuit is now completed from positive (from jack terminals 42) on wiper W1 through contact $d_4$, in lower position, and stop initiating relay PS to negative on contact $g_3$. Stop initiating relay PS operates.

$ps_1$ moved to upper position connects a condenser CA to the coil of stop initiating relay PS to act as a release delaying device later.

$ps_2$ prepares to short circuit the start relay R when the desired floor is reached, from the positive below S via terminals 23, 22.

When the lift arrives within a short distance of the fourth floor, another inductor relay, stop relay S, is operated by a stopping inductor plate SP. Closure of the contact $s_1$ applies positive through jack terminals 24, contact $ps_2$, terminals 23 and 22 to a point midway between the start relay R and associated resistance RA which by way of jack terminals 14 and 38 and contact J3 is connected with the negative. This releases the start relay R.

$r_1$ opening removes negative potential coming from jack terminals 33 from the coil of the up drive contactor UD which releases.

$r_5$ closing applies positive potential via terminals 25, 26, 27 and wiper W2 to the right hand coil of call storage relay D then through contact $d_1$ (closed) terminals 32, 38, contact $g_3$ to negative. This coil has the same number of turns as the left hand coil, but is connected in the reverse sense so that call storage relay D is deenergized and releases.

$ud_2$ and $ud_3$ (Fig. 2) disconnect the lift driving motor stator from the 3-phase supply and deenergize the brake BK. The lift comes to rest at the desired floor.

$d_1$ opening breaks the holding circuit of call storage relay D, so that this relay is completely deenergized.

$d_2$ opens the negative side of the operating circuit of relay R from $g_3$, terminals 38, 14 and resistance RA.

$d_4$ moving to upper position removes positive from one side of stop initiating relay PS, but this relay remains held operated by the discharging of condenser CA for a time sufficient to enable the passenger to open the lift gate.

$ps_3$ opens the circuit from contact $g_3$ to all the call storage push buttons, preventing the storage of any further calls for the moment.

The passenger requiring to use the lift now opens the lift gates and enters the car. Contact LD of floor D gate in the gate circuit breaks the circuit of gate relay G and this relay releases whilst the gate is held open.

$g_1$ and $g_2$ open the circuits of the driving contactors UD and DD, preventing the lift from starting whilst the gate is open. It will be recalled that contact $r_1$ has previously been opened.

$g_3$ prevents the energization of any call storage relays.

As the passenger enters the lift, a lift floor switch FS is closed. This operates lift floor relay H from positive via terminal 16 through relay to terminals 18 and 38 to negative at $g_3$ as soon as the gate is closed and gate relay G re-operated, the contact $h_1$ breaking the circuit of the landing push button LP1–LP4 and preventing call storage therefrom.

Assuming that the passenger (being in the lift at the fourth floor) now presses a button such as CP1, for the first floor, call storage relay A is operated, its contact $a_2$ by closing operating start relay R from positive at the relay through terminals 14 and 38 to negative at contact $g_3$. Contact $a_3$ opens the circuit from the positive through wiper W1 from terminal 42 of the middle coil of direction relay DR via terminals 36, 40 to negative beyond relay DR and through the wiper W1, still on the fourth contact, via contacts $d_4$, terminals 41, 39 and $dr_2$ (latter on right contact) energizes the bottom coil of direction relay DR in a direction opposite from that in which the upper coil of the relay is energized from contact $dr_1$. The magnetism produced by these two coils therefore cancel, and the direction relay releases, contact $dr_3$ going to the left contact indicating that the lift is required to travel in a downward direction. Subsequent operations are similar to those already described for upward lift travel except that contact $dr_3$ through contact $g_2$ and terminals 34 now causes energization of the down drive contactor DD instead of up drive contactor UD.

No reference has yet been made to the function of the switch bank WB3 and wipers W3$a$ and W3$b$. This is a single contact bank divided into two sections, there being no mechanical separation or point of division in the row of contacts. A double ended wiper W3$a$, W3$b$ is provided, the wipers being connected to a positive potential through terminals 13. The end of this double wiper designated W3$a$ cooperates with a set of contacts (right half of bank WB3) connected to leads to terminals 9–12 which as will be seen later, are employed to give a visual indication of the lift's position.

The wiper W3$b$ has the function of ensuring that the stepping switch does not remain out of synchronism with the position of the lift for any long period. This is performed by means of the synchronizing relay T and the limit switches UL and DL. The interaction of these devices is such that when the lift reaches the end of its travel in an upward or downward direction, the wiper W3$b$ of the switch is stepped to an extreme position if by any mischance it is not already there.

Assuming for instance that the wiper W3$b$ is on the third contact (shown on second) from the left end of the bank WB3 when the lift reaches the upper limit of its travel and operates the switch UL, the wiper W3$b$ (assumed on the third contact) is now standing on a contact connected to the two coils of synchronizing relay T.

This synchronizing relay is connected to two resistances RT1 and RT2 both connected to negative potential, though this potential is prevented from causing a current to flow through either of the coils as the resistances are normally short-circuited through terminals 1 and 2 by the limit switches UL and DL. In the condition above stated, (wiper W3$b$ on third contact) the operation of switch UL removes the short-circuit via terminal 1 from the resistance RT1 connected to it, with the result that relay T is energized on one coil and operates. Contact $t_1$ then closing supplies positive potential from wiper W3$b$ through self-interrupter contacts $wd$ and $wu$ and contact $dr_5$ to the stepping magnet WU, which is energized and steps the switch in a direction to follow the lift, that is up. The interrupter contact $wu$ is broken by the energization of the stepping magnet WU, and the wiper W3$b$ of the switch steps by self-interruption in known manner until it reaches a contact corresponding to the position occupied by the lift. In the drawings, this will be, in the example given the fourth contact from left end in the bank WB3 on which the wiper W3$b$ will then rest. When the wiper W3$b$ reaches this position (fourth contact) it leaves the section of contacts connected to synchronizing relay T, and the latter releases because the wiper circuit is opened, and the contact $t_1$ by opening interrupts the stepping circuit to the switch stepping magnet WU. A similar action to this occurs when the lift reaches the lower limit switch DL whilst the wiper W3$b$ of the switch is standing on any contact other than the first at the left in its bank WB3, except that stepping will then take place in a downward direction by energization of stepping magnet WD through contact $dr_4$.

If the control apparatus is required for use in connection with a collector type lift, connections similar to those shown in Fig. 4 are used. As is well known, a collector type lift is one which stops at any floor for which a call has been stored, whether started towards that particular floor or not. A single push button collector stops at a floor whether the intending passenger wishes to travel in its direction of motion or not, since no signal is given by the passenger regarding his intended journey. It is also the practice in connection with lifts of this type to arrange for the lift to travel to the furthest call ahead of it, and not necessarily to the end of the shaft, before reversing its direction of travel.

The arrangements in accordance with the present invention are such that these conditions are met by modifying the connections to the various items of the control apparatus in the manner shown. The most important variation is that concerned with call storage. Whereas previously the energizing circuits of the push buttons were taken through the contacts $ps_3$ and $h_1$, which prevented storage when the lift was in motion, when any lift gate was open, or which prevented the use of floor landing push buttons when a passenger was in the car, all these push buttons are now taken direct to full negative potential. Thus depression of any push button whether in the car or at a landing operates one of the storage relays A–D if not already operated, thus causing the lift to stop when it next passes the floor corresponding to the push button depressed.

Again, the lamps AL$p$–DL$p$ are provided to indicate where the lift is, and its direction of travel. These lamps are not essential to the working of the lift, but they assist passengers in determining when to depress a push button. Thus if a passenger wishes to descend, and the lift is below and travelling upwards it is inadvisable to depress the push button causing the lift to stop at the floor where the passenger is situated, as otherwise he may be carried off in the wrong direction i. e upwards, before being delivered to the correct destination.

The lamps AL$p$–DL$p$ are provided at each floor and possibly in the lift car as well, these lamps being connected suitably in parallel and to contacts of the right half of the bank WB3 and are lighted as the circuits are completed by wiper W3$a$. This wiper (W3$a$–W3$b$) moves in synchronism with the lift as already explained, and keeps one or more lamps lighted, thereby indicating at each floor the position of the lift.

To indicate the direction of travel of the lift, two further lamps DN and UP are provided at each floor, and are energized via the two position contact $dr_6$, operated by the direction relay DR. This contact is always in a position corresponding to the lift's direction of travel, and its moving portion or contact $dr_6$ is shown connected to positive from terminals 7 so that the lamps through terminals 5 or 6 remain normally lighted. If necessary this positive connection can be taken through terminals 7 and 4 to contact $r_6$ and terminal 3, so that the lamps are lighted only when the lift is actually in motion.

It has been said in the description of the essentials of a collector lift that it travels in one direction until all the calls ahead of it are answered, and only then does it reverse. This point, although partially dealt with in connection with the fully automatic push button lift already described, is covered by the circuit arrangements of direction relay DR. This relay is so connected that when no calls for the lift are stored, a positive potential is applied from wiper W1 through the call storage contact chain $a_3$–$d_4$ to both sides of the center coil of the direction relay DR. All of the coils of this direction relay are deenergized if the contact of the direction relay is in a position to drive the lift downwards as shown. The direction relay DR remains in this condition so long as any call exists below the lift, because under these conditions positive is supplied from wiper W1 through the call storage relay chain $a_3$–$d_4$ to the left hand side of the center coil of direction relay DR, thus short-circuiting the resistance and preventing the direction relay from operating. Alternatively, if calls exist both above and below the position of the lift then although this short-circuit on the resistance is removed, no path to positive potential through the center coil of the direction relay is obtained until the lift reaches the lowest call stored, certain of contacts $a_3$–$d_4$ being open.

If, however, the lift is moving upwards the contact $dr_1$ is closed, thus energizing the upper coil of the direction relay and keeping it in an operated position. It remains so until the lift reaches the top call stored, in which case positive is applied from wiper W1 through the closed portion of contact chain $a_3$–$d_4$ and thence through the operated contact $dr_2$ and the lower coil of the direction relay to negative. The two energized coils of the direction relay DR now act in opposite directions on the core causing its demagnetization, and the direction relay releases. By this means the lift is caused to travel in one direction until all calls ahead of it are answered whereupon it may reverse and answer all calls ahead of it in the opposite direction.

So far, two types of operation have been shown to be possible using control apparatus according to my invention. If Fig. 5 is substituted for Fig. 4 yet another system is obtained. This is the one known as a dual-purpose service, and it enables the lift to act during part of the day as a fully automatic push button device, and during another part of the day as an operator controlled device. The only modification of importance in Fig. 5 is that of the addition of a changeover key having contacts CO1–CO6. When this key is in the position shown, that is, contacts CO1–CO6 to the left, the lift acts in a manner identical with that described in connection for Figures 1, 2, and 3 i. e. the respective push button circuits CP1–CP4 and LP1–LP4 are connected through terminals 20, 21, 19, and 38 to the negative at $g_3$ as in Figure 1 with Figure 3, it travels to and answers one call at a time, all other calls being disregarded. This type of lift, however, is unsuitable for use in connection with fairly heavy traffic such as often occurs at certain periods of the day, so that at these times we provide arrangements whereby an operator may take over the function of directing the lift's motion. At all other periods of the day, the lift reverts to the fully automatic push button type.

This change of function is performed by the operator in throwing the key CO from the position shown to an operated position with contacts CO1–CO6 on the right hand contacts. This as will be seen applies full negative potential from contacts CO1 and CO2 to both car (CP1–CP4) and landing (LP1–LP4) push buttons, but in addition contacts CO3–CO6 in their right hand position by cutting the circuits to the call storage relays prevent the landing push buttons from storing calls directly on these relays A–D. Instead of registering a call depression of any of these push buttons, LP1–LP4, operates one of the usual drop type indicators F1–F4 which are situated in the lift car and are arranged to be manually reset.

The operation of the lift with contacts CO3–CO6 at the right is now different in that an intending passenger at a landing, instead of storing a call and bringing the lift to the particular landing, operates an indicator (F1–F4) which shows the lift attendant that a passenger is waiting at the indicated floor. The attendant to answer the call now depresses a car push button (CP1–CP4) and stores a call on one of the call storage relays A–D whereon the lift moves off in the direction required. If another landing call, indicated by the drops F1–F4 matures ahead of the lift or if a passenger in the car wishes to alight before reaching the floor at which the intending passenger wishes to embark, the attendant can stop the lift by depression of the appropriate car push button. The indicators F1–F4 may be reset manually in the usual way by the operator after each traverse, or after each floor has been visited. Restoration of the key CO and contacts CO1–CO6 to the position shown, once more enables the services of the operator to be dispensed with at the cost of a reduction in speed of service.

So far, description of the operation of the systems has been confined to that of lifts using four floors only. More or fewer floors may easily be catered for, the following alterations alone being necessary to the apparatus shown in Fig. 1.

1. Further call storage relays similar to the relays A–D must be provided, one for each floor, and wired to further contacts on the stepping switch bank WB2 and also to further terminal points similar to those numbered 28–31. In practice, a number of standardized control sets or units of the type shown are made, differing only in that the respective sets may possess 4, 6, 8, 10 or 12 call storage relays, and thus a control set appropriate to any particular job, with the correct number of call storage relays, is provided. If an odd number of floors is to be served, a plate with one extra call storage relay is supplied, that is, a plate with 10 relays if nine floors are to be served, and the contacts of this relay are short circuited or left disconnected as required. This avoids the need for keeping a large number of slightly different types of apparatus units in stock.

2. Further contacts on the stepping switch bank WB1, according to the number of floors, are connected to further call storage relay contacts in a more extended chain similar to the one shown as extending between contacts $a_3$ and $d_4$.

3. Further contacts corresponding to the added floors similar to the contacts $a_2$ are connected to the start relay R.

4. Further contacts on the portion of the switch bank WB3 connected to wiper W3a are wired to appropriate terminals corresponding to terminals 9 to 12 so that further indicating lamps may be added for the added floors.

5. A greater number of contacts on the portion of the switch bank WB3 available to the wiper W3b to take care of the added floors should be connected together and to relay T.

Thus it has been shown that the control apparatus, of which the circuit is shown in Fig. 1, can be used for a variety of different types of lift service, merely by inter-connecting the various jack terminals provided. These jack terminals are located on a rack which carries a mounting plate on which the various relays and the stepping control switch in Fig. 1 are mounted (see later). The plate end relays are, therefore, standard and can be made in quantity quite independently of the type of service desired, or the distance between floors. This very considerably cheapens the manufacturing processes involved, and in addition leads to great flexibility of interconnection on the site. Further, should any fault develop in the control apparatus, it may be removed from the rack, as it may be provided with a contact-making jack and simple fixing means. Another similar control apparatus may thereupon be substituted and the faulty plate removed for attention without interrupting the service of the lift for more than a few seconds. This again is a point of considerable importance when the lift is constantly in use.

Referring to Fig. 6, it will be seen how the various portions of apparatus are interconnected. The control apparatus group is provided with a multiple point jack and terminal strip TL, and connections from the latter are taken to the group of switch gear which contains the circuit breakers controlled by contactors UD and DD and any other heavy current switching device necessary for driving the lift. From the switch gear connections are taken to the driving motor ST and the brake BK. Further connections are taken from the interconnecting terminals through the trailing cable to the lift car, on which are fitted the limit switches, inductor relays, safety contacts and car push buttons. Another coupling connects the interconnecting terminals to the gate and push button contacts and also the floor indicating lamps. Further connections are made between the terminals on the strip, to determine as already described the nature of service to be given by the lift. If necessary, this type of service may be changed without any appreciable alteration in the apparatus supplied in connection with any particular lift; thus a lift may be supplied and connected to operate as a fully automatic push button device and may afterwards be converted to a collector or other type of lift depending on the demands made on the service.

Finally, Figures 7 and 8 show the manner of mounting the apparatus used in our control system, and also the method whereby the apparatus unit is easily detachable from the frame on which it is normally supported.

From Fig. 7 it will be seen that the relays used in the circuit are mounted in the positions shown and designated by the corresponding reference characters. The vacant rectangles between the two rows of relays are spaces for the inclusion of other relays necessary when the apparatus has to control a lift working between more than four floors. The rectangles labelled Q are condensers which are used for spark quenching and like purposes, and the circle RA comprises certain of the resistances used in the circuit. The stepping switch W is mounted on the plate along with the relays, and wiring between it and the relays and between both and the connecting plugs CP is carried out by means of a local cable form.

The mounting plate P as shown in Fig. 8 has a turned back portion provided with L slots forming tongues for engaging with holes FP in a frame or rack PK. These holes locate and support the plate when placed on the rack. As the solid edges of the holes FP enter the long limbs of the slots as the tongues enter the holes, the points of the plugs CP enter into the splayed ends of the shelf jacks CK making contact therewith. This method enables the whole of the plate CP to be removed in a very short time for purposes of replacement or adjustment.

Each of the connecting jacks CJ is provided with a row of terminals TL and it is on these terminals corresponding to terminals 1 to 42 that interconnections are provided whereby the control apparatus is modified to suit any particular system of lift operation. Connections from the other portions of the lift control system are also brought to these terminals when connection to the apparatus on the plate is necessary.

If required, the relays may be mounted on one plate and the switch on another as this may enable a smaller plate to be used in case of lifts serving a small number of floors. It is however problematical whether the saving in space effected is likely to be of advantage in view of the necessity of manufacturing and stocking a number of different sized parts of the same type.

It should be noted that although the interconnecting terminals are part of the system which is individual to each particular lift installation, the plate P and the apparatus it bears may be removed and another similar plate substituted without seriously affecting the operation of the lift, this being a particularly useful facility when adjustment or cleaning of the apparatus is necessary.

Although my control apparatus has been shown to be capable of adaption to three systems of control, it should be understood that it is not limited solely to these three, but may be employed in connection with a variety of modifications or variations of lift control by means of alterations to the connections made to and on the terminal connecting strip, without any appreciable alteration of the apparatus fitted on the control plate.

I claim:

1. In combination, a plurality of lift control systems, each provided with a series of fixed jack terminals, an interchangeable unit comprising a plate upon which are mounted a plurality of call storage relays with associated operating contacts, relay means for determining the direction of movement of the lift and magnet operated switching means for following the movement of the lift, said relays and switching means having circuit connections with jack terminals on said plate arranged to cooperate with the series of fixed jack terminals of any one of said plurality of systems.

2. In a lift control system the combination with a series of fixed jack terminals to which call push button and lift operating control circuits are connected, of an interchangeable unit comprising a plate having mounted thereon a plurality of call storage relays and their associated contacts, a direction relay with direction controlling contacts, a stepping switch having magnets for stepping it in either direction for following the movements of the lift, plate jack terminals corresponding with said fixed jack terminals, circuit connections from said relays and their contacts and from said switch and the stepping magnets to said plate jack terminals and means for removably holding the plate jack terminals in cooperating relation with the fixed jack terminals.

3. In a lift control system as in claim 2, a fixed supporting frame associated with said fixed jack terminals for supporting said plate of the interchangeable unit with the corresponding jack terminals in engagement.

4. In a lift control system with a series of fixed jack terminals having circuit connections to call push buttons in the lift, to call push buttons at the respective floors and to contactors for effecting up and down travel of the lift, the combination therewith of an interchangeable unit comprising a plate having mounted thereon a plurality of call storage relays and their associated contacts, a direction relay with direction controlling contacts, a stepping wiper switch having a wiper cooperating with a plurality of wiper contacts and magnets for stepping the wipers in either direction for following the motion of the lift, jack terminals on said plate corresponding with said fixed jack terminals, circuit connections from said relays and their contacts and the stepping magnets and the wiper contact to said plate jack terminals and means for removably holding the plate jack terminals in cooperative relation with the fixed jack terminals.

5. In a lift control system with a series of fixed jack terminals having circuit connections to call push buttons in the lift and at each floor, to lamps for indicating the position and direction of travel of the lift and to contactors for effecting up and down travel of the lift the combination therewith of an interchangeable unit comprising a plate having mounted thereon a plurality of call storage relays and their associated contacts, a direction relay with direction controlling contacts, a stepping wiper switch having a wiper cooperating with a plurality of wiper contacts and magnets for stepping the wipers in either direction for following the motion of the lift, jack terminals on said plate corresponding with said fixed jack terminals, circuit connections from said relays and their contacts and the stepping magnets and the wiper contacts to said plate jack terminals and means for removably holding the plate jack terminals in cooperative relation with the fixed jack terminals.

6. In a lift control system with a series of fixed jack terminals having circuit connections to call push buttons in the lift, to call push buttons at the respective floors and to contactors for effecting up and down travel of the lift, said push button circuits being associated with switching means for rearranging the circuits for operator control, the combination therewith of an interchangeable unit comprising a plate having mounted thereon a plurality of call storage relays and their associated contacts, a direction relay with direction controlling contacts, a stepping wiper switch having a wiper cooperating with a plurality of wiper contacts and magnets for stepping the wipers in either direction for following the motion of the lift, jack terminals on said plate corresponding with said fixed jack terminals, circuit connections from said relays and their contacts and the stepping magnets and the wiper contacts to said plate jack terminals and means for removably holding the plate jack terminals in cooperative relation with the fixed jack terminals.

7. In a lift control system the combination with a series of fixed jack terminals to which push button and lift operating control circuits are connected, of an interchangeable unit comprising a plate having mounted thereon a plurality of call storage relays and their associated contacts, a direction relay with direction controlling contacts, plate jack terminals corresponding with said fixed jack terminals, circuit connections from said relays and their contacts to said plate jack terminals and means for removably holding the plate jack terminals in cooperative relation with the fixed jack terminals.

8. In a lift control system the combination with a series of fixed jack terminals to which push button and lift operating control circuits are connected, of an interchangeable unit comprising a plate having mounted thereon a plurality of call storage relays and their associated contacts, plate jack terminals corresponding with said fixed jack terminals, circuit connections from said relays and their contacts to said plate jack terminals and means for removably holding the plate jack terminals in cooperative relation with the fixed jack terminals.

9. In a lift control system the combination with a series of fixed jack terminals to which call push button and lift operating control circuits are connected, of an interchangeable unit comprising a plate having mounted thereon a direction relay with direction controlling contacts, plate jack terminals corresponding with said fixed jack terminals, circuit connections from said relay and its contacts to said plate jack terminals and means for removably holding the plate jack terminals in cooperative relation with the fixed jack terminals.

10. In a lift control system the combination with a series of fixed jack terminals to which call push button and lift operating control circuits are connected, of an interchangeable unit comprising a plate having mounted thereon a stepping switch with a plurality of contacts having magnets for stepping it in either direction for following the movements of the lift, plate jack terminals corresponding with said fixed jack terminals, circuit connections from said switch contact and its magnets to said plate jack terminals and means for removably holding the plate jack terminals in cooperative relation with the fixed jack terminals.

NORMAN CAROL SMART.